United States Patent [19]

Calvani et al.

[11] Patent Number: 5,329,394
[45] Date of Patent: Jul. 12, 1994

[54] FREQUENCY MODULATION COHERENT OPTICAL COMMUNICATIONS SYSTEM WITH CONTINUOUS POLARIZATION SCRAMBLING

[75] Inventors: Riccardo Calvani, Pino Torinese; Renato Caponi; Giuseppe Marone, both of Turin, all of Italy

[73] Assignee: CSELT-Centro Studi E Laboratori Telecomunicationi S.p.A., Turin, Italy

[21] Appl. No.: 883,836

[22] Filed: May 15, 1992

[30] Foreign Application Priority Data

Jul. 4, 1991 [IT] Italy .................. TO 91 A 00519

[51] Int. Cl.$^5$ .................. H04B 10/00; H04B 10/04
[52] U.S. Cl. .................. 359/156; 359/182; 359/181; 359/192
[58] Field of Search .................. 359/156, 181, 183, 188, 359/189, 190, 191, 192, 182; 385/24

[56] References Cited

U.S. PATENT DOCUMENTS

| | | | |
|---|---|---|---|
| 5,008,958 | 4/1991 | Cimini et al. | 359/192 |
| 5,023,949 | 6/1991 | Auracher et al. | 359/192 |
| 5,031,236 | 7/1991 | Hodgkinson et al. | 359/192 |
| 5,107,358 | 4/1992 | Hodgkinson | 359/156 |

FOREIGN PATENT DOCUMENTS

0428119A3  5/1991  European Pat. Off. ..... H04B 10/14

OTHER PUBLICATIONS

W. K. Burns et al., Depolarised Source for Fiber–Optic Applications, paper presented at OFC '91, San Diego, Calif., Feb. 18–22, 1991.
A. D. Kersey et al., New Polarisation–Insensitive Detection Technique for Coherent Optical Fibre heterodyne Communications Electronics Letters, vol. 23, No. 18, Aug. 27, 1987.
T. Hideaki et al.; Appl. No. JP870056503; Abstract vol. 013018; Method and Device for Polarization Diversity Optical Reception Electronics Letters; vol. 25, No. 8; Apr. 13, 1989; Novel Polarisation–Frequency Conversion–Type Polarisation Diversity Optical Receiver.

Primary Examiner—Richard E. Chilcot, Jr.
Assistant Examiner—R. Bacares
Attorney, Agent, or Firm—Herbert Dubno

[57] ABSTRACT

A coherent optical communications system with continuous polarization scrambling, wherein such scrambling is obtained by combining orthogonally polarized radiations at different frequencies emitted by two independent sources. The two sources may be employed to build the transmitted or the local oscillator of the system.

3 Claims, 2 Drawing Sheets

FREQUENCY MODULATION COHERENT OPTICAL COMMUNICATIONS SYSTEM WITH CONTINUOUS POLARIZATION SCRAMBLING

FIELD OF THE INVENTION

The present invention relates to optical communications systems and, more particularly, to a frequency modulation, optical-fiber coherent communications system with continuous polarization scrambling.

BACKGROUND OF THE INVENTION

It is known that conventional monomode optical fibers used in optical communications systems exhibit birefringence characteristics varying both in time and along the fiber axis, so that the state of polarization of the propagating signals varies in a continuous and unpredictable manner. In coherent communications systems, and especially systems with heterodyne reception which are the most widely used, it is essential to have a definite and constant state of polarization at the fiber output. Indeed, the receivers can correctly operate only if the state of polarisation of the received signal coincides with that of the signal generated by the local oscillator; otherwise only part of the electromagnetic field undergoes heterodyning, with consequent signal fading which may even be total. The problem could be solved by using polarization maintaining fibers, that solution is seldom adopted since such fibers are rather expensive, have a high attenuation and may give rise to a noise increase if the alignment of the fiber axes at the joints, if any, is not correct. Thus, in coherent communications systems it is preferred to use conventional, low-birefringence optical fibers and to take measures for making the receiver polarisation-insensitive. This is generally achieved by scrambling the state of polarization of either the transmitted signal or the signal generated by the local oscillator in a non-adaptive continuous or discrete manner within each bit period.

Generally such scrambling is performed by means of modulators external to the source. Transmission rates of the order of some hundred Mbit/s or some Gbit/s are used in the coherent systems and the modulators allowing the state of polarization of the signals to be scrambled at a rate compatible with such bit rates are integrated-optics guide elements. Such elements are generally expensive and moreover give rise to high losses, due to both the attenuation of the guide itself and the coupling between the guide and the possible fiber piece allowing connection to an optical fiber.

In accordance with the invention, we provide a coherent optical communications system wherein polarization scrambling is obtained without using devices external to the source but by exploiting two orthogonally-polarised radiations at different frequencies.

The combination of two orthogonally-polarised radiations at different frequencies to obtain insensitivity to polarization fluctuations in detection systems or in optical fiber communications systems has been disclosed in the literature, yet the proposed systems exploiting this combination cannot be used to solve the problem of obtaining polarization scrambling without use of external modulators.

More particularly, the paper "Depolarized source for fiber-optic applications" presented by W. K. Burns et al. at the OFC'91 Conference (San Diego, Calif., Feb. 18–22, 1991) and published at page 205 of the conference proceedings, describes a system in which the two radiations, generated by respective lasers, are combined to obtain in line a depolarized radiation. The paper does not disclose how such depolarized radiation can be combined with information transmission in a coherent system, whereas the goal of the invention is (to provide a coherent system which does not require external devices to obtain polarization scrambling.) The two lasers emit always at a constant frequency, and the difference between the two frequencies is large compared to the frequencies encountered in the application of interest. If such a system was employed to obtain polarization scrambling in a coherent communications system, there would be a risk that the beats with the signal generated by a local oscillator would be outside the detector band, so that demodulation of the information would be impossible. Moreover, polarization scrambling causes a broadening of the information signal band which increases with the polarization scrambling rate. Should the system disclosed in the paper be used, receivers with very wide band would have to be employed, thereby causing a great increase in the noise present in the received signal.

The article "New polarization-insensitive detection technique for coherent optical fibre heterodyne communications" by A. D. Kersey et al., Electronics Letters, Vol. 23, No. 18, Aug. 27, 1987, discloses the use of the two orthogonally-polarised radiations at different frequencies to obtain the output signal of the local oscillator in a polarization diversity heterodyne receiver for a coherent communications system. The two radiations are obtained from a single source, by means of a polarising beam splitter generating the two orthogonal polarizations and of an acousto-optic modulator placed downstream the beam splitter, on the path of only one of the two orthogonally-polarized radiations. Also in this case, the two radiations always have a constant frequency and hence the considerations already made for OFC'91 still hold. Besides, even assuming that both signals outgoing from the acousto-optic modulator are used, and not only the frequency shifted signal, the invention cannot be obtained, since only one of the two radiations would be frequency-modulated. In the method of polarization scrambling in an optical signal transmission system, according to the invention, optical signals are modulated by a binary digital information signal and undergo heterodyne coherent demodulation. Two sources of linearly polarized radiation are frequency modulated by the information signal, so that the two sources emit radiations at a first and a second frequency or at a third and a fourth frequency, respectively, in correspondence with the first and the second logic level of the information signal. The third and fourth frequencies differ from the first and the second frequencies by an amount at least equal to the inverse of the bit period in the binary signal. The states of polarization of the radiations emitted by the two sources are rendered orthogonal in correspondence with each bit of the information signal. The two orthogonally polarized radiations are combined in order to send on a transmission line, for each bit, a signal comprising two orthogonally-polarized components at the first and the third frequency and at the second and the fourth frequency, respectively, whereby a linear polarization is obtained whose plane rotates by at least 360° in the bit period.

Moreover linearly polarized radiations at a first and a second frequency are generated in a local oscillator by means of two independent sources, the two frequencies differing by an amount at least equal to the inverse of the bit period in the binary signal. The states of polarization of the radiations emitted by the two sources are rendered orthogonal and the two orthogonally polarized radiations can be combined in order to generate a signal comprising two orthogonally-polarized components at the first and the second frequency, respectively, whereby a linear polarization is obtained with a plane of polarization rotating by at least 360° in the bit period, this signal being combined with the received modulated signal.

In these systems the frequency difference can be equal to the inverse of the bit period.

The transmission system using polarization scrambling can comprise a transmitter with means for modulating an optical signal with a binary information signal and means for continuously scrambling, in each bit period, the state of polarization of the modulated signals. The system also includes a receiver comprising a local oscillator generating a signal which is combined with the signal. The means for sending the modulated signals on the line and for scrambling the state of polarization of such signals are made by the same group of devices and which can comprise:

a first source of light radiations, which emits radiations linearly polarized in a first plane and is biased by the information signal so as to emit radiations at a first or a second frequency according to whether the information signal presents the first or the second of the two logic levels;

a second source of light radiations, which emits radiations linearly polarized in a second plane orthogonal to the first plane and is biased by the information signal so as to emit radiations at a third or a fourth frequency, according to whether the information signal presents the first or the second of the two logic levels, the third and fourth frequencies being very close to the first and second frequencies but differing therefrom by an amount at least equal to the inverse of the bit period; and means for combining the radiations emitted by the two sources into a single radiation which is sent onto an optical fiber transmission line and comprises, for each of the two logic levels of the information signal, two orthogonally-polarized components having the first and third frequencies or the second and fourth frequencies, respectively, so that, for both logic levels, a resulting linear polarization is obtained the plane of which rotates by at least 360° in the bit period.

Where the local oscillator is used, the means for scrambling the state of polarization of the signals generated by the local oscillator can comprise:

a first source of light radiations, which emits radiations linearly polarized in the first plane;

a second source of light radiations, which emits radiations at a second frequency linearly polarized in a second plane orthogonal to the first plane, the second frequency being very close to the first frequency but differing therefrom by an amount at least equal to the inverse of the bit period of the information signal; and means for combining the radiations emitted by the two sources into a single radiation which comprises two orthogonally-polarized components and has a resulting linear polarization the plane of which rotates by at least 360° in the bit period.

BRIEF DESCRIPTION OF THE DRAWING

The above and other objects, features and advantages of the invention will become more readily apparent from the following description, reference being made to the accompanying highly diagrammatic drawing in which:

FIG. 1 is a block diagram of the system in which the information to be transmitted is frequency modulated and the polarisation scrambling is applied to the transmitted signal.

SPECIFIC DESCRIPTION

Figure 1:
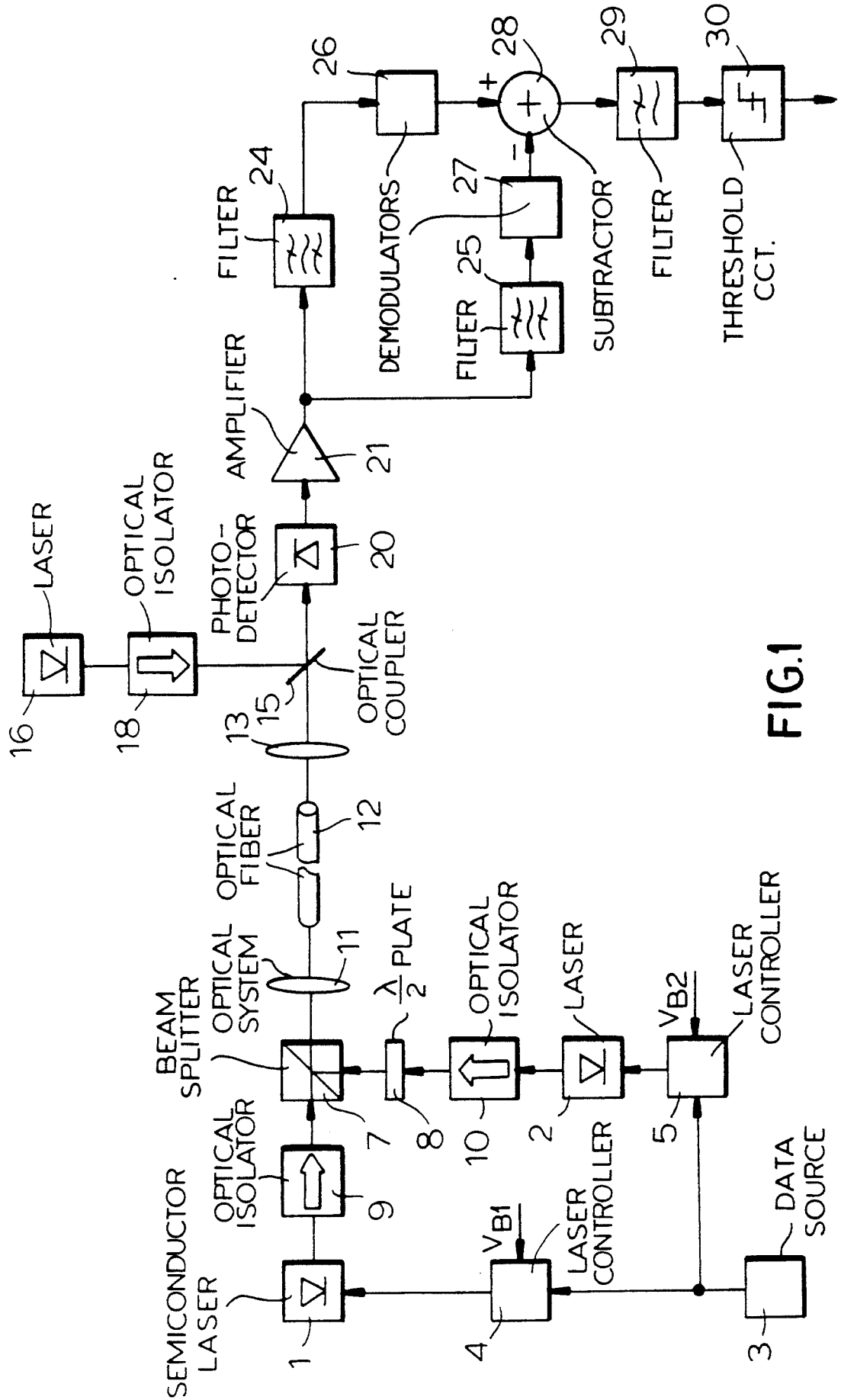
FIG. 1 refers to the case

In the drawing, two semiconductor lasers 1, 2, which are as far as possible similar to each other, are connected to a source 3 of the binary data flow, which frequency modulates the two lasers. For this purpose, the signals coming from source 3 are fed to control devices 4, 5 of lasers 1, 2, where they are superimposed upon the d.c. bias voltages VB1, VB2 and cause the lasers to oscillate at a respective frequency $f_0$ or $f'_0$ in correspondence with logic value 0 of the binary signal, and at a frequency $f_1$ or $f'_1$ in correspondence with logic value 1. The radiation emitted by laser 1, which is a linearly polarized radiation, is sent to a polarizing beam splitter 7 and is received e.g. on the transmitting face thereof; splitter 7 receives also, on the reflecting face, the radiation emitted by laser 2, which has passed through a half-wave plate 8 and hence is polarised in an orthogonal plane to that of the radiation emitted by laser 1. Isolators 9, 10 prevent the rays reflected by the mirror or the plate from re-entering lasers 1, 2.

It is worth noting that two individual sources, even though nominally equal, always have a certain frequency difference $\Delta f$ due to the random fluctuations of the respective oscillation frequency, and that difference is practically impossible to compensated. The invention exploits just that difference which, because the radiation is linearly polarized in orthogonal planes, produces a resulting linear polarization whose plane rotates at an angular velocity $\Delta\omega = 2\pi\Delta f$. More particularly, voltages VB1, VB2 will be chosen so that, neglecting the fluctuations, the difference $\Delta f$ between frequencies $f_0$, $f'_0$ and $f_1$, $f'_1$, respectively, is at least equal to the inverse of the bit period, for reasons which will be explained later.

Splitter 7 combines the two beams and sends the resulting radiation, through a suitable optical system schematically represented by lens 11, into a low-birefringence monomode fibre 12, forming the system transmission line. Two orthogonally polarised components, with slightly different frequencies, will then be present in the line for each bit of the information signal.

At the fibre output, the transmitted signal is combined in a coupler 15 with the signal emitted by a local oscillator, namely a semiconductor laser 16 having a line width as far as possible equal to that of lasers 1, 2 and operating at a frequency $f_L$ different from $f_0$, $f_1$ and $f_0$, $f'_1$. Isolator 18, having the same functions as isolators 9, 10, is placed between oscillator 16 and compensator 17. The beam resulting from the combination is sent to a photodetector 20 the output signal of which, through amplifier 21, is fed to two passband filters 24, 25 having such a passband as to comprise F0, F'0 and F1, F'1, respectively (where Fi, F'i indicate frequencies $f_L - f_i$ and $f_L - f'_i$, respectively, with i = 0, 1). The filtered signals are then demodulated in demodulators 26, 27, e.g. of the square law type. The signal outgoing from demodulator 27 is subtracted in a subtractor 28 from the signal outgoing from demodulator 26, so as to double the dynamics, and the signal resulting from the subtraction is supplied to a low pass filter 29 delimiting the signal base band. A threshold circuit 30, e.g. a zero crossing detector, supplied the recovered data signal.

The operation of the described embodiment is as follows: Whatever the logic value of the bit to be transmitted, two orthogonally polarized radiations at slightly different frequencies $f_0$, $f'_0$ or respectively $f_1$, $f'_1$ are transmitted over the line. Combination of such radiations results, as said, in a radiation the state of polarization of which rotates at a frequency equal to the frequency difference between the two component radiations. Since such a difference is at least equal to the bit rate, during a bit period the polarization of the signal sent over the line by the transmitter will pass through all possible states where the relative phase of the resulting field (leaving the amplitudes unchanged) continuously varies. Thus, the continuous polarization scrambling necessary to eliminate the effects of random polarization variations caused by the fibre is achieved. Indeed during the bit period, the line signal will have at least a component in the same polarization plane as the signal generated by the local oscillator, and the heterodyne beat necessary for the coherent demodulation can be obtained.

The frequency difference between lasers 1, 2 in both emission conditions must be at least equal to the inverse of the bit period so that the state of polarization effects at least one complete rotation in the bit period. Such a difference could also be greater, yet the polarization scrambling causes a widening of the received signal band which increases with the scrambling rate. The drawbacks inherent in a band widening are well known to the ordinary worker skilled in the art, an therefore preferably the state of polarization performs a single rotation in the bit period.

It is to be appreciated that the receiver scheme is identical to that of a conventional FSK receiver; only, the band requirements of filters 24, 25 must be compatible with the presence of two components at different frequencies, i.e. the filters must be transparent to the polarization scrambling frequency. In practice, this entails the use of filters whose passband is almost twice that necessary for a conventional receiver without polarization scrambling.

Figure 2:
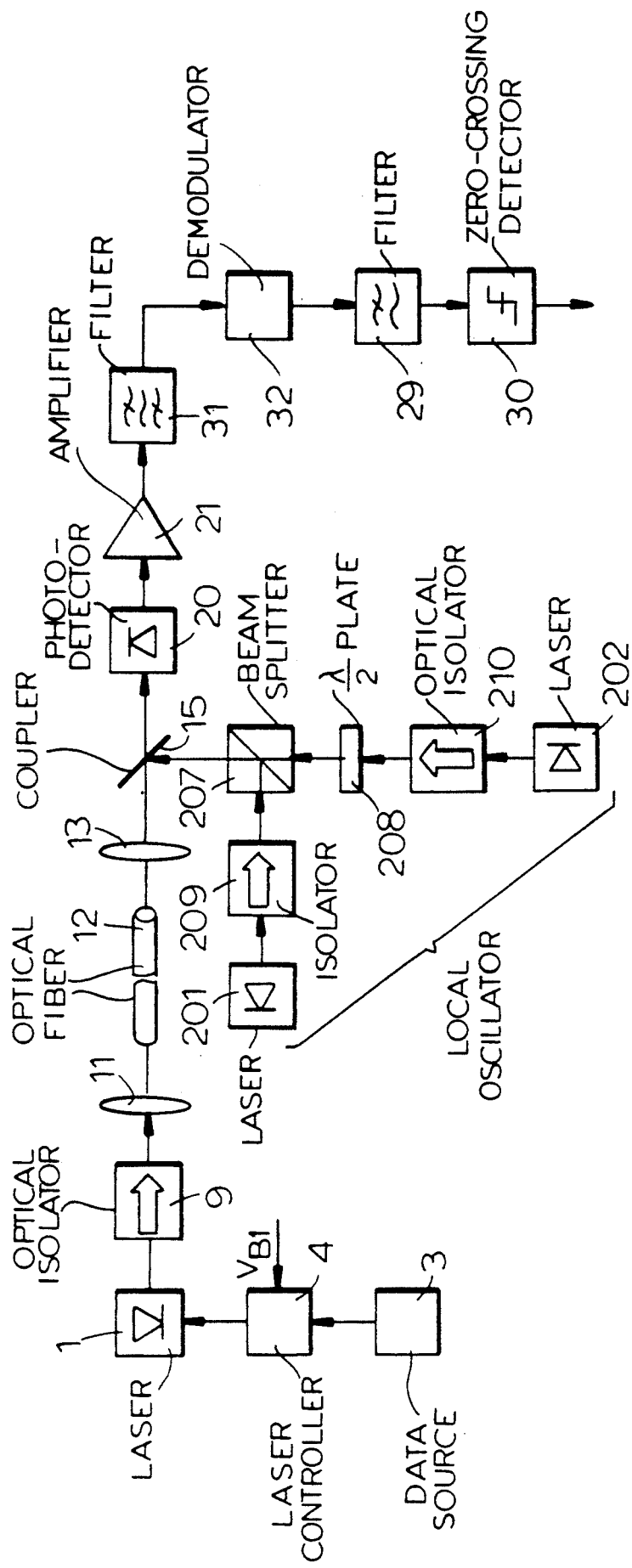
FIG. 2 is a block diagram of the system using the local oscillator.

The principle adopted can also be used to make a polarization diversity receiver, as shown in FIG. 2. Here, the transmitter comprises a single laser, for instance laser 1, frequency modulated by the data signal. The signal emitted by said laser is the line signal. At the receiving side, the local oscillator comprises two lasers 201, 202 emitting radiations at frequencies $f_L$, $f'_L$ whose difference is at least equal to the inverse of the bit period of the information signal, polarising beam splitter 207, half-wave plate 208 and isolators 209, 210. Device 207–210 have exactly the same tasks as devices 7–10 in FIG. 1. In the electrical part of the receiver, demodulation is carried out by using a single channel: amplifier 21 is followed by a passband filter 31 with a passband tuned on frequency $F0 = f_0 - f_L$, and by a demodulator 32, directly connected to low-pass filter 29. This solution (single-channel FSK), which may be employed also in the diagram of FIG. 1, is structurally simpler than the one employing two-channel demodulation, yet the greater constructional simplicity entails the loss of the power associated with the second frequency present in the beam sent to detector 20.

The operation principle is similar to that of FIG. 1, the only difference being that the state of polarization continuously varying in the bit period is that of the signal generated by the local oscillator instead of that of the line signal.

We claim:

1. A method of polarization scrambling in an optical signal transmission system in which optical signals are modulated by a binary digital information signal and undergo heterodyne coherent demodulation, said method comprising the steps of:
    (a) frequency modulating of linearly polarized radiation by a binary digital information signal, so that the two sources emit radiations at a first and a second frequency and at a third and a fourth frequency, respectively, in correspondence with a first and a second logic level of the information signal, the third and fourth frequencies differing from the first and the second frequencies by an amount at least equal to an inverse of a bit period in the binary signal;
    (b) rendering states of polarization of the radiations emitted by the two sources orthogonal in correspondence with each bit of the information signal; and
    (c) combining the two orthogonally polarized radiations to send on a transmission line in the form of an optical fiber, for each of said bits, a signal comprising two orthogonally-polarized components at the first and the third frequency and at the second and the fourth frequency, respectively, whereby a linear polarization is obtained with a polarization plane rotating by at least 360° in a bit period.

2. The method according to claim 1, wherein the frequency difference is equal to the inverse of the bit period.

3. A coherent optical fiber transmission system using polarization scrambling comprising:
    a transmitter with means for modulating an optical signal with a binary information signal and means for continuously scrambling, in each bit period of the binary information signal period, a state of polarization of the modulated optional signals; and
    a receiver comprising a local oscillator generating a signal which is combined with a line signal, said transmitter comprising:
    a first source of light radiations, which emits radiations linearly polarized in a first plane and is biased by the information signal so as to emit radiations at a first or a second frequency according to whether said information signal presents a first or a second of two logic levels;
    a second source of light radiations, which emits radiations linearly polarized in a second plane orthogonal to the first plane and biased by the information signal so as to emit radiations at a third or a fourth frequency, according to whether said information signal presents the first or the second of the two logic levels, the third and fourth frequencies being very close to the first and second frequencies but differing therefrom by an amount at least equal to an inverse of the bit period; and
    means for combining the light radiations emitted by the two sources into a single radiation which is sent onto an optical fiber transmission line and comprises, for each of the two logic levels of the information signal, two orthogonally-polarized components having the first and third frequencies and the second and fourth frequencies, respectively, so that, for both logic levels, a resulting linear polarization is obtained with a polarization plane rotating by at least 360° in the bit period.

* * * * *